United States Patent
Staudenmaier et al.

(10) Patent No.: US 10,049,428 B2
(45) Date of Patent: Aug. 14, 2018

(54) DIAGNOSTIC DATA GENERATION APPARATUS, INTEGRATED CIRCUIT AND METHOD OF GENERATING DIAGNOSTIC DATA

(75) Inventors: Michael Staudenmaier, Munich (DE); Kshitij Bajaj, Sirsa (IN); Mehul Kumar, Meerut (IN); Steven McAslan, Glasgow (GB); Sarthak Mittal, Dehli (IN)

(73) Assignee: NXP USA, Inc., Austin, TX (US)

( * ) Notice: Subject to any disclaimer, the term of this patent is extended or adjusted under 35 U.S.C. 154(b) by 457 days.

(21) Appl. No.: 14/390,193

(22) PCT Filed: Apr. 5, 2012

(86) PCT No.: PCT/IB2012/051701
§ 371 (c)(1),
(2), (4) Date: Oct. 2, 2014

(87) PCT Pub. No.: WO2013/150342
PCT Pub. Date: Oct. 10, 2013

(65) Prior Publication Data
US 2015/0161759 A1    Jun. 11, 2015

(51) Int. Cl.
*G06T 1/60* (2006.01)
*G09G 3/20* (2006.01)
(Continued)

(52) U.S. Cl.
CPC .......... *G06T 1/60* (2013.01); *G09G 3/20* (2013.01); *G09G 3/2092* (2013.01); *G09G 5/363* (2013.01);
(Continued)

(58) Field of Classification Search
CPC .. G09G 2330/12; G09G 2360/12; G09G 3/20; G09G 5/36; G09G 3/2092; G09G 2340/0421; G09G 5/39; G09G 5/393; G09G 5/005; G06T 1/60; H04N 1/00209; G06F 21/554; G06F 21/57
(Continued)

(56) References Cited

U.S. PATENT DOCUMENTS 4,837,844 A * 6/1989 Urushibata ........... G06T 3/0006
345/648
5,673,416 A    9/1997 Chee et al.
(Continued)

OTHER PUBLICATIONS

International Search Report and Written Opinion correlating to PCT/IB2012/051701 dated Dec. 28, 2012.
(Continued)

*Primary Examiner* — Gregory J Tryder
*Assistant Examiner* — Kwang Lee

(57) ABSTRACT

A diagnostic data generation apparatus for a display controller comprises an underrun detector arranged to monitor, when in use, buffer depletion in order to detect an underrun condition. The underrun condition results from a data feed lag associated with a mismatch between a buffer fill rate and a predetermined output data rate. The underrun detector is arranged to generate diagnostic data in response to detection of the underrun condition, the diagnostic data identifying the underrun condition and a location in an array of pixels associated with the underrun condition.

19 Claims, 3 Drawing Sheets

(51) Int. Cl.
   *G09G 5/36* (2006.01)
   *G09G 5/00* (2006.01)
   *G09G 5/393* (2006.01)
(52) U.S. Cl.
   CPC ............... *G09G 5/005* (2013.01); *G09G 5/36* (2013.01); *G09G 5/393* (2013.01); *G09G 2330/12* (2013.01); *G09G 2360/12* (2013.01)
(58) Field of Classification Search
   USPC ........................................................ 345/531
   See application file for complete search history.

(56) References Cited

U.S. PATENT DOCUMENTS

| | | | |
|---|---|---|---|
| 5,978,868 A | 11/1999 | Maas | |
| 6,853,381 B1* | 2/2005 | Grigor | G09G 5/393 |
| | | | 345/503 |
| 7,034,812 B2 | 4/2006 | Chen et al. | |
| 7,202,870 B2 | 4/2007 | Chen et al. | |
| 7,843,460 B2 | 11/2010 | Rai et al. | |
| 2003/0142058 A1 | 7/2003 | Maghielse | |
| 2003/0184532 A1 | 10/2003 | Chen et al. | |
| 2008/0165268 A1* | 7/2008 | Takahashi | H04N 5/232 |
| | | | 348/333.01 |
| 2010/0073388 A1 | 3/2010 | Mostinski et al. | |
| 2011/0169849 A1* | 7/2011 | Bratt | G06T 1/60 |
| | | | 345/545 |
| 2012/0166890 A1* | 6/2012 | Janarthanam | G06F 11/08 |
| | | | 714/49 |

OTHER PUBLICATIONS

Fujitsu Semiconductor, "Chapter 6.5: Registers," and "Chapter 9: Video Display Controller," MB88F332: LSI Product Specifications, Edition 1.5; Jun. 1, 2012; 86 pages.

* cited by examiner

DIAGNOSTIC DATA GENERATION APPARATUS, INTEGRATED CIRCUIT AND METHOD OF GENERATING DIAGNOSTIC DATA

FIELD OF THE INVENTION

This invention relates to a diagnostic data generation apparatus, a method of generating diagnostic data, and an integrated circuit.

BACKGROUND OF THE INVENTION

In the field of image processing for displays, it is known to provide a so-called "display control unit" for receiving image data from a memory and converting the image data to signals for display by a visual display unit, for example a Liquid Crystal Display (LCD), such as a thin-film transistor (TFT) LCD.

The display control unit comprises a display controller for accessing the image data. The display controller typically also comprises a number of buffers into which the image data is transferred prior to processing by one or more functional unit, for example a pixel format converter. The image data is received in respect of a number of channels, each channel relating to a given "plane". A so-called "blending unit" of the display controller therefore serves to combine the image data in respect of the different channels prior to display by the display unit driven by a display driver of the display control unit. In this regard, the image data is displayed at a predetermined update frequency, for example 60 Hz.

In order to fill the buffers, the image data is retrieved from a given memory by way of a memory access and stored in the buffers, different ranges of memory being used to stored image data respect of different channels. Whilst the buffers are being filled, the image data is being read out of buffers and processed and provided to the display at the predetermined frame rate. In contrast with the frequency at which signals are provided to the display unit, the image data read into the buffers is bandwidth limited as a result of limitations of the memory in which the image data is stored. In this respect, the memory may have priorities to serve other host units and so be unable to fill the buffers at a rate required by the display controller. Given that the display controller is unconcerned by the latency associated with operation of the memory from which the image data is obtained, it can be seen that circumstances can arise when one or more buffers lack image data for processing and driving the display unit. The display controller therefore continues to drive the display unit using empty buffers. This situation is known as an "underrun" condition and results in the display unit failing to display properly the image data intended for display.

US patent publication no. 2011/0169849 describes a graphics system including a display pipe with a buffer configured to store pixels to be processed by a display controller for displaying on a display device. A buffer control circuit detects underruns of the buffer when the display controller is attempting to read pixel data from the buffer that has not yet been written to the buffer. In such circumstances, the buffer control circuit tried to ameliorate the situation by supplying a pixel to the display selected from a previously stored set of underrun pixels, for example a most recent valid pixel read by the display controller.

US patent publication no. 2010/0073388 also describes a display controller, but this document addresses the data feed latency by providing an alternative path to a Random Access Memory storing image data.

U.S. Pat. No. 7,843,460 describes a graphics processor that includes a memory for storing image data for presentation. The graphics controller also includes bandwidth control logic to monitor a data feed latency. When an underrun is detected, the graphics processor uses an averaging technique in order to average a given number of preceding pixels, or uses a previous pixel, in order to generate a final pixel for display.

US patent publication no. 2003/0142058 relates to an LCD controller architecture that employs a technique whereby pixels are tagged and discarded based upon whether the pixels are valid or invalid and pixels are not written to an output buffer in the event that an input buffer underruns.

US patent publication number 2003/0184532 relates to a display controller capable of automatically tuning an output rate thereof. The output rate of the display controller can be reduced by reducing a rate of a pixel clock or modifying image resolution.

In relation to all of the above described controllers, underruns are addressed either by techniques intended to avoid them or by techniques intended to mitigate the effects of the underruns. The above known controllers do not provide a useful level of diagnostic information.

SUMMARY OF THE INVENTION

The present invention provides a diagnostic data generation apparatus, a method of generating diagnostic data and an integrated circuit as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Figure 1:
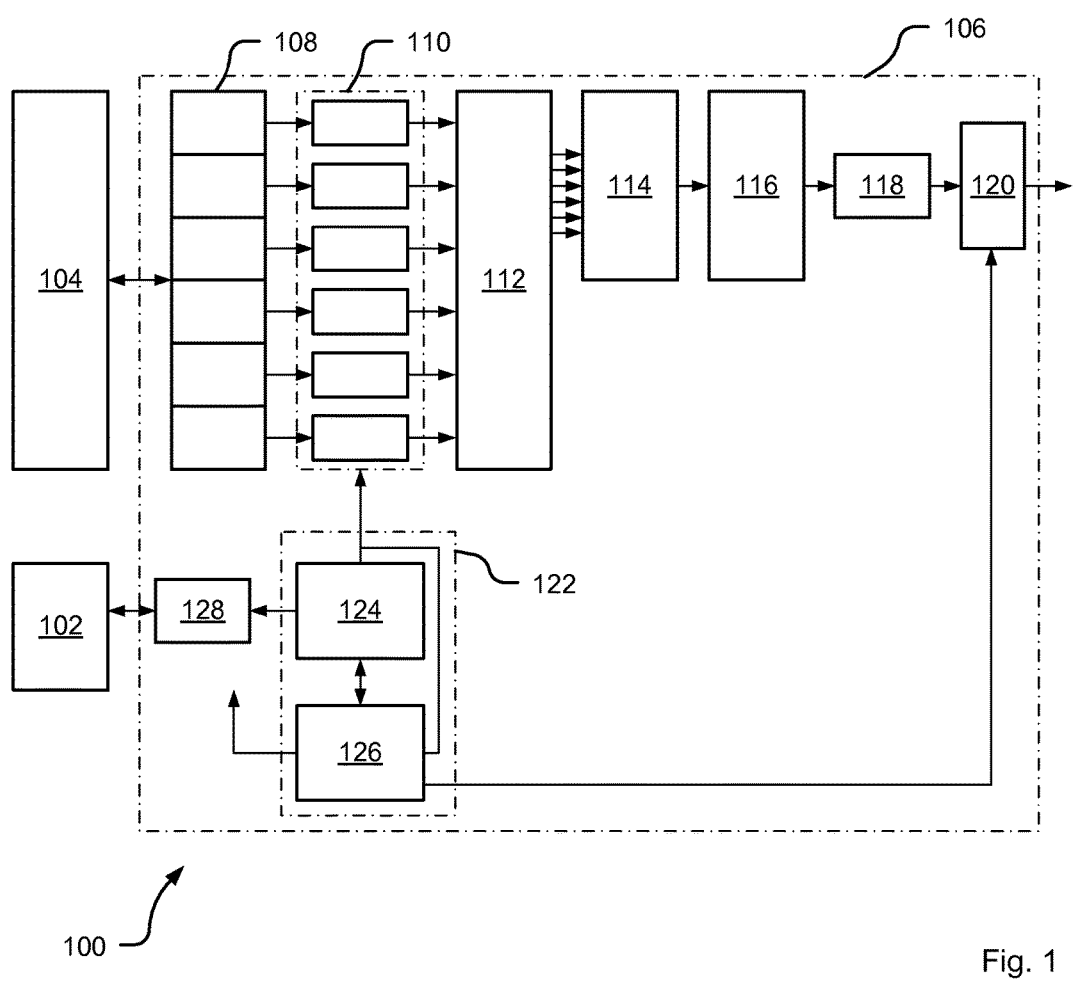
FIG. 1 is a schematic diagram of an example of a system-on-chip device comprising a diagnostic data generation apparatus.

Referring to FIG. 1, the example of a system-on-chip (SoC) device 100 shown comprises a processing unit 102, for example a processor core, a memory 104 such as a digital memory, that is a memory capable of digital storage, and a display controller 106. The SoC may for example be a microprocessor and for example include a central processing unit (CPU) and/or a coprocessor and/or a digital signal processor and/or an embedded processor and/or a microcontroller (μC) and/or a graphic processing unit. Although in the example only a single processing unit 102 is shown, it will be apparent that the SoC may comprising multiple processing unit and e.g. comprise a microprocessor with one, two, four or more processor cores.

The display controller 106 may, as shown, comprise a memory access unit 108 arranged to access different memory address ranges, which may correspond to different memory instances and/or types (not shown), each address range corresponding to different channels of data. The memory access unit 108 is operably coupled to the memory 104 and a set of First In First Out (FIFO) input buffers 110. The number of FIFO buffers provided corresponds to the number of data channels mentioned above and each buffer may be used for a different channel. The set of FIFO buffers 110 is operably coupled to a pixel format converter unit 112 for converting pixel data to a common format for further processing, for example a 32-bit per pixel data structure. A blending unit 114 is coupled to the pixel format converter 112 for combining a plurality of pixels, such as six pixels in this example, in a predetermined order and according to desired alpha and chroma settings or any other display-related setting. The exact blending configuration to be employed is obtained from registers (not shown) by the blending unit 114, thereby configuring the order and desired display-related settings.

A gamma correction unit 116 is operably coupled to the blending unit 114, and arranged to correct a gamma parameter for blended pixel data output by the blending unit 114. An output FIFO buffer 118 is coupled to the gamma correction unit 116 and to a display driver 120.

The display driver 120 is operably coupled to a flow controller 122. The flow controller 122 is coupled to the FIFO input buffers 110 as well as other of the functional units mentioned above (connections not shown), for example the pixel format converter unit 112, the blending unit 114, the gamma correction unit 116 and the FIFO output buffer 118. The flow controller 122 comprises an underrun detector 124 and a timing controller 126. The underrun detector 124 is operably coupled to the timing controller 126. The underrun detector 124 is coupled to the FIFO input buffers 110 and a set of diagnostic data registers 128, the diagnostic data registers 128 being accessible by the processing resource 102.

Figure 2:
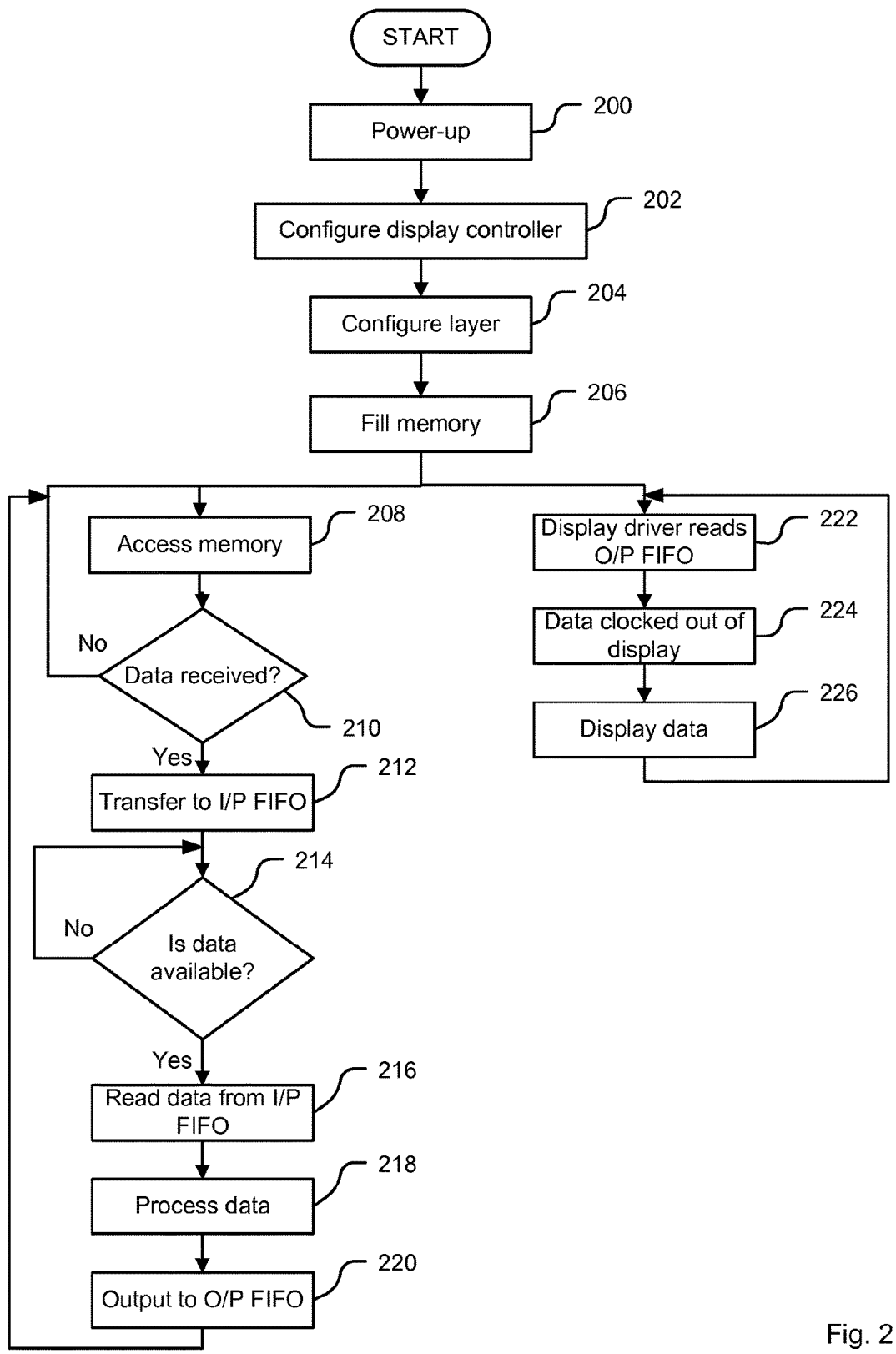
FIG. 2 is a flow diagram of an example of operation of the system-on-chip of FIG. 1.

Referring to FIG. 2, when in operation, the SoC device 100 is initially powered up, 200, and the processing resource 102 then configures 202 the display controller 106 according to characteristics of a display (not shown) to be used with the display controller 106, for example a size of the display and a speed of the display. For example, the blending unit 114 may be configured by retrieving a blending configuration corresponding to the type of display from the registers. Thereafter, the processing resource 102 configures 204 the organisation of layers, details of which will be described hereinafter. Once the layers have been configured by the processing resource 102, the memory 104 is filled 206 in response to demands on the SoC device 100 by applications supported by the processing resource 102. In this respect, graphics content data for the memory 104, for example, may be generated by a CPU, a Graphics Processing Unit (GPU) or obtained by data transfer from a mass data storage unit, such as a hard disc drive.

The memory access unit 108 then accesses 208 the memory 104 and awaits 210 receipt of pixel data from the memory 104. If pixel data is received from the memory 104, the memory access unit 108 then transfers 212 the acquired pixel data to the input FIFO buffers 110. If no pixel data is received, the memory access unit 108 waits until pixel data is received from the memory 104.

Meanwhile, the pixel format converter unit 112 monitors 214 the input FIFO buffers 110 to determine if pixel data is present in the input FIFO buffers 110 for pre-processing. In this respect, if any one of the FIFO buffers 110 is empty, the pixel format converter unit 112 will wait for the empty input FIFO buffers 110 to contain pixel data. When all of the input FIFO buffers 110 contain pixel data, the pixel format converter unit 112 reads 216 the pixel data from the input FIFO buffers 110 and converts 218 the read pixel data to the common format mentioned above. The blending unit 114 then blends the parallel streams of pixel data according to the layer configuration mentioned above, and thereafter the gamma correction unit 116 corrects the blended pixel data. For the sake of brevity, the processing of the pixel data and other implementation details associated with the processing of the pixel data will not be described further herein, but any suitable processing may be performed.

Once the pixel data has been processed 218, the processed pixel data is output 220 to the output FIFO buffer 118.

In parallel with the above process (208 to 220), i.e. at least partially overlapping in time, the display driver 120, under the timing control of the timing controller 126, reads 222 the output FIFO buffer 118 irrespective of whether or not the output FIFO buffer actually contains any processed pixel data. In the event that the output FIFO buffer 118 contains processed pixel data, as opposed to undefined data, the display driver 120 translates the processed pixel data into electrical signals in a format suitable to be used by the display and the translated processed pixel data is effectively clocked out 224 to the display for presentation 226 by the display at a predetermined output data rate. However, in the event that the output FIFO buffer 118 does not contain any processed pixel data and the display driver 120 would nevertheless attempt to translate undefined data this would result in an undesirable scrambled display effect visible to a user.

Figure 3:
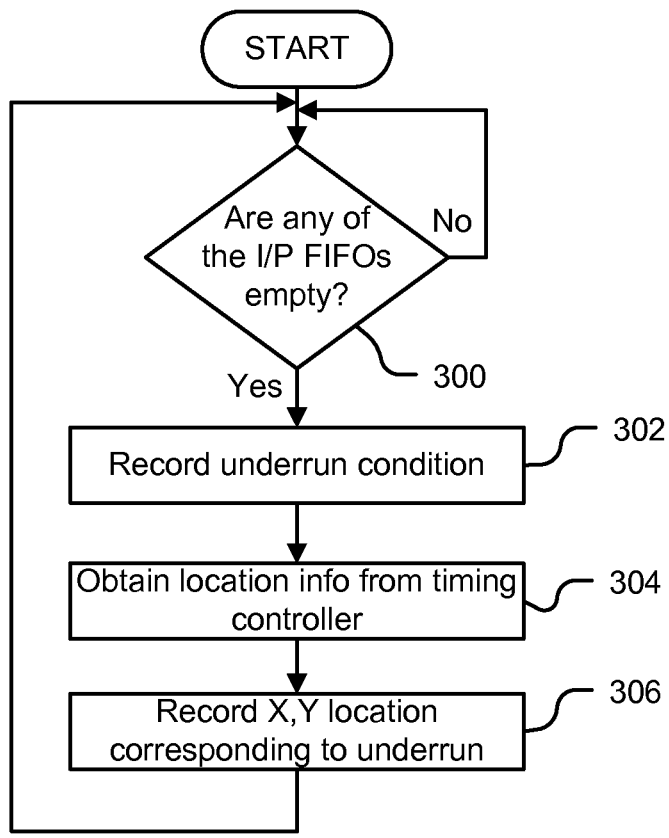
FIG. 3 is a flow diagram of a method of providing diagnostic data performed by the apparatus of FIG. 1.

Referring to FIG. 3, in order to detect such an underrun condition, the underrun detector 124 monitors the set of input FIFO buffers 110 in order to determine if any of the input FIFO buffers are empty 300, i.e. depleted or pixel data, as a result of a data feed lag caused by a mismatch between a buffer fill rate of at least one of the set of input FIFO buffers 110 and the predetermined output data rate of the display driver 120. Upon detection of the underrun condition, the underrun detector 124 records 302 the occurrence of the underrun condition in one of the set of diagnostic data registers 128. The underrun detector 124 then interrogates 304 the timing controller 126 in order to obtain location data indicative of the location in a viewable area of the display, for example X and Y coordinates, that are affected by the underrun condition. This location data can be derived by the timing controller 126 as the timing controller 126 can identify pixel data accessed and hence expected, but hitherto not received. Thereafter, the underrun detector 124 records 306 the location data corresponding to the underrun condition in a number of registers in the set of diagnostic data registers 128. Also, the underrun detector 124 identifies the channel associated with the underrun condition and stores this identity as a flag in an underrun register (not shown) dedicated to the channel in question. It therefore follows that other underrun registers (also not shown) are provided for storing flags to identify when other channels are associated with an underrun condition.

The data recorded in connection with the underrun condition can, in one embodiment, be used by a debugging unit to identify a possible cause of the underrun condition. Alternatively, in another embodiment, the underrun detector 124 generates and communicates an interrupt to the processing resource 102. In response to the interrupt, the processing resource 102 accesses the set of diagnostic data registers 128 in order to obtain the diagnostic data, for example location data associated with the underrun condition. The processing resource 102 then analyses the diagnostic data and takes remedial action in response to the analysis of the diagnostic data. For example, the processing resource 102 can decide to move data from the memory 104 to another memory (not shown) on the basis that the another memory is faster than the memory 104 and so can provide the pixel data to the set of input FIFO buffers 108 with less latency than the memory 104, thereby avoiding future occurrences of the underrun condition in respect of the location identified.

Alternatively, the processing resource 102 can be arranged to deactivate a given layer associated with the location identified as being related to the underrun condition. In such circumstances and the previous example of remedial action, the processing resource 102 determines the layer to which the underrun condition relates. In this respect, in the shown example the pixel format converter 112 and the blending unit 114 have a number of inputs, which can be considered to be channels, which relate to pixel data that is "blended" or combined by the blending unit 114. A predetermined number of layers, for example six layers, supported by the display controller 106, typically the highest priority layers in terms of contribution to the visual appearance of a pixel point, are respectively assigned to the channels, which are sometimes referred to as "planes" in the art. In this regard, the display controller 106 calculates the layers to be respectively assigned to the channels available, the layers being a prioritised stack of objects defining rectangular arrangements of pixel with respect to the coordinate system associated with the display and other properties thereof.

Hence, upon combination by the blending unit 114, for each pixel point on the display, the blending unit 114 generates an ordered composite of the highest priority layers as allocated to the channels mentioned above. For the avoidance of doubt, it should be appreciated that each pixel point may be associated with a different combination of layers, because each layer is definable in many respects, but particularly in relation to the dimensions of the layer and the position of the layer on the display. Consequently, at a given pixel point a different combination of layers may contribute to the blend composite of the given pixel point as compared with another pixel point.

As the location of the underrun condition is identified to the processing resource 102, the processing resource 102 can, after identifying the channel associated with the underrun condition (using the underrun registers mentioned above), replicate the calculation performed to identify the layers respectively allocated to the channels. Hence, the processing resource 102, knowing the channel associated with the underrun condition, can infer the layer allocated to the channel associated with the underrun condition.

In another embodiment, the processing resource 102 may only use knowledge of the channel associated with the underrun condition, without performing further calculation to identify a specific layer associated with the underrun condition.

It is thus possible to provide an apparatus and method that enables diagnostic data to be generated relating to an underrun condition, thereby enabling identification of a cause of the underrun condition to be identified and remedied in real time, if required, or subsequently by a diagnostic engineer. By rapid identification and resolution of the underrun condition, it may be possible to prevent perception of the effects of the underrun condition by a user.

Of course, the above advantages are exemplary, and these or other advantages may be achieved by the invention. Further, the skilled person will appreciate that not all advantages stated above are necessarily achieved by embodiments described herein.

The invention may also be implemented in a computer program for running on a programmable apparatus, at least including code portions for performing steps of a method according to the invention when run on a programmable apparatus, such as a computer system or enabling a programmable apparatus to perform functions of a device or system according to the invention. A computer program is a list of instructions, such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored, e.g. internally in the programmable apparatus, on a computer readable storage medium or transmitted to the computer system via a computer readable transmission medium. All or some of the computer program may be provided on, tangible or non-tangible, computer readable media permanently, removably or remotely coupled to an information processing system. The computer readable media may include, for example and without limitation, any number of the following: magnetic storage media including disk and tape storage media; optical storage media such as compact disk media (e.g., CD ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

The programmable apparatus may for instance include at least one processor, such as a microprocessor, microcontroller or digital signal processor, associated memory and a number of input/output (I/O) devices. When executing the computer program, the programmable apparatus processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims, and that the claims are not limited to the specific examples shown or described. For example, the underrun detector 124 may be supported external to the flow controller 122 instead of forming part of the flow controller 122 as illustrated in FIG. 1. Accordingly, unless implied or stated otherwise the underrun detector 124 can be formed as part of the flow controller 122 or external to the flow controller 122.

Some of the above embodiments, as applicable, may be implemented using a variety of different information processing architectures for systems on chips. For example, although FIG. 1 and the discussion thereof describe an example of an information processing architecture, this example is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of the system-on-chip device 100 are circuitry located on a single integrated circuit i.e. on the same, or different, dies in the same IC package or within a same device. Alternatively, the system-on-chip device 100 may include any number of separate integrated circuits or separate devices interconnected with each other. For example, the memory 104 and/or the processing resource 102 may be located on a same integrated circuit as the display controller 106 or on a separate integrated circuit or located within another device, peripheral or slave discretely separate from other elements of system-on-chip device 100.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

The examples set forth herein, or portions thereof, may be implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A diagnostic data generation apparatus for a display controller, the apparatus comprising:
   a buffer to store pixel data; and
   an underrun detector coupled to the buffer, the underrun detector to monitor buffer depletion in order to detect an underrun condition, to generate diagnostic data in response to detection of the underrun condition, wherein the diagnostic data identifies the underrun condition and a location in an array of pixels associated with the underrun condition, and the location in the array of pixels associated with the underrun condition is X and Y coordinates of a viewable area of a display that are affected by the underrun condition.

2. The apparatus as claimed in claim 1, wherein the underrun detector is arranged to calculate the location in the array of pixels associated with the underrun condition.

3. The apparatus as claimed in claim 2, wherein the location in the array is calculated by identifying expected pixel data that is not available in response to a memory access.

4. The apparatus as claimed in claim 1, wherein the underrun detector is arranged to determine a plane associated with the underrun condition.

5. The apparatus as claimed in claim 4, wherein the diagnostic data includes data identifying the plane identified.

6. The apparatus as claimed in claim 1, wherein the underrun detector is arranged to determine a layer associated with the underrun condition.

7. The apparatus as claimed in claim 6, wherein the diagnostic data includes data identifying the layer identified.

8. The apparatus as claimed in claim 1, wherein the underrun detector is arranged to store the diagnostic data.

9. The apparatus as claimed in claim 8, wherein the stored diagnostic data is accessible by a debug unit.

10. The apparatus as claimed in claim 1, wherein the underrun detector is arranged to generate an interrupt in response to the detection of the underrun condition.

11. The apparatus as claimed in claim 1, wherein the apparatus is included in a display controller.

12. The apparatus as claimed in claim 11, further comprising:
an input buffer;
a memory access unit capable of loading image data from a memory into the input buffer at a memory access rate; and
an output at which processed image data is provided at the predetermined output rate.

13. The apparatus as claimed in claim 1, wherein the apparatus is included in a system-on-chip.

14. The apparatus as claimed in claim 13, the system-on-chip comprising a display controller which includes the apparatus.

15. The apparatus as claimed in claim 13, the system-on-chip further comprising:
a processing unit; and
a memory.

16. The apparatus as claimed in claim 1, wherein the underrun condition results from a data feed lag associated with a mismatch between a buffer fill rate of the buffer and a predetermined output data rate.

17. A method of generating diagnostic data for a graphics controller, the method comprising:
monitoring buffer depletion in order to detect an underrun condition; and
generating diagnostic data in response to detection of the underrun condition, the diagnostic data identifying the underrun condition and a location in an array of pixels associated with the underrun condition, and the location in the array of pixels associated with the underrun condition is X and Y coordinates of a viewable area of a display that are affected by the underrun condition.

18. The method of claim 17, wherein the underrun condition results from a data feed lag associated with a mismatch between a buffer fill rate of the buffer and a predetermined output data rate.

19. A method of generating diagnostic data for a graphics controller, the method comprising:
monitoring buffer depletion in order to detect an underrun condition resulting from a data feed lag associated with a mismatch between a buffer fill rate and a predetermined output data rate; and
generating diagnostic data in response to detection of the underrun condition, the diagnostic data identifying the underrun condition and a location in a viewable area of a display associated with the underrun condition, and the location of the viewable area of a display associated with the underrun condition is in X and Y coordinates.

\* \* \* \* \*